United States Patent
Gokhale

(10) Patent No.: US 7,996,147 B2
(45) Date of Patent: Aug. 9, 2011

(54) LOCOMOTIVE ENGINE MULTI-FUEL CONTROL SYSTEM AND METHOD

(75) Inventor: Manoj Prakash Gokhale, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/128,034

(22) Filed: May 28, 2008

(65) Prior Publication Data

US 2009/0299609 A1   Dec. 3, 2009

(51) Int. Cl.
*F02D 41/30* (2006.01)
*F02D 41/02* (2006.01)
*G06F 11/30* (2006.01)
*G01M 15/05* (2006.01)

(52) U.S. Cl. ........ 701/105; 701/103; 701/104; 701/110; 60/602; 702/182; 73/114.53

(58) Field of Classification Search ............... 123/27 R, 123/27 GE, 295, 299, 304, 361, 369, 399, 123/403, 435, 457–460, 500–506, 511–513, 123/540–542, 555–557, 563, 564, 575, 568.12, 123/568.21; 701/102–105, 108, 110, 111, 701/114, 115; 702/182, 186–188; 73/114.52, 73/114.53

See application file for complete search history.

(56) References Cited

U.S. PATENT DOCUMENTS

| | | | | | |
|---|---|---|---|---|---|
| 5,117,800 | A | * | 6/1992 | Watson et al. | 123/575 |
| 5,139,002 | A | * | 8/1992 | Lynch et al. | 123/575 |
| 5,245,953 | A | * | 9/1993 | Shimada et al. | 123/25 E |
| 5,271,357 | A | * | 12/1993 | Hsu et al. | 123/23 |
| 5,271,370 | A | * | 12/1993 | Shimada et al. | 123/25 A |
| 5,970,251 | A | * | 10/1999 | Zimmermann et al. | 717/168 |
| 6,209,530 | B1 | * | 4/2001 | Faletti et al. | 123/568.21 |
| 6,848,416 | B1 | * | 2/2005 | Pien | 123/305 |
| 7,069,727 | B2 | * | 7/2006 | Hellat et al. | 60/777 |
| 7,296,555 | B2 | * | 11/2007 | Tamma et al. | 123/304 |
| 7,360,522 | B2 | * | 4/2008 | Tamma et al. | 123/299 |

* cited by examiner

*Primary Examiner* — Willis R Wolfe, Jr.
*Assistant Examiner* — Johnny H Hoang
(74) *Attorney, Agent, or Firm* — GE Global Patent Operation; John A. Kramer

(57) ABSTRACT

A method, in certain embodiments, includes controlling a first parameter set (e.g., fuel injection timing, engine speed, etc.) of an engine to reduce specific fuel consumption to account for a plurality of different fuels alone or in combination with one another. The method also may include controlling a second parameter set (e.g., engine duration, engine speed, manifold air pressure, fuel supply temperature, fuel supply pressure, etc.) of the engine to reduce the possibility of exceeding design limits associated with the engine to account for the plurality of different fuels alone or in combination with one another.

10 Claims, 6 Drawing Sheets

LOCOMOTIVE ENGINE MULTI-FUEL CONTROL SYSTEM AND METHOD

BACKGROUND

The present technique relates generally to a system and method of operating an engine and, more specifically, to a system and method for controlling the engine to enable use of a variety of different fuels with the engine.

Internal combustion engines are generally designed for one specific fuel. In general, internal combustion engines may be classified as either compression-ignition or spark-ignition engines. A common compression-ignition engine is a diesel engine, and a common spark-ignition engine is a gasoline engine. Engines also may be classified as either two-stroke or four-stroke. A four stroke engine includes an intake stroke, a compression stroke, a power stroke, and an exhaust stroke. During the intake stroke, the engine introduces fuel and air into a cylinder as its respective piston moves away from top dead center (TDC) in the cylinder. During the compression stroke, the piston moves toward TDC in the cylinder, thereby compressing the fuel/air mixture until ignition. The ignition occurs due to a spark (e.g., a spark plug) in a spark-ignition engine. In contrast, the ignition occurs due to the heat of compression and/or a glow plug in a compression-ignition engine. During the power stroke, the combustion of the fuel/air mixture causes significant heat and pressure in the cylinder, thereby driving the piston away from TDC and creating mechanical output power through the crankshaft, transmission, and so forth. During the exhaust stroke, the piston moves back toward TDC, thereby forcing the exhaust out of the cylinder. A two stroke engine operates by combining the power stroke with the exhaust stroke, and by combining the intake stroke with the compression stroke.

In each of these engines, a variety of parameters affect the engine performance, fuel efficiency, exhaust pollutants, and so forth. Exhaust pollutants include carbon oxides (e.g., carbon monoxide), nitrogen oxides (NOx), sulfur oxides (SOx), unburnt hydrocarbons (HC), and particulate matter (PM). Furthermore, each engine typically has design limits, such as speed, flow rate, temperature, and pressure, associated with the various components. For example, the design limits may include in-cylinder peak firing pressure (PFP), pre-turbine temperature (PTT) of a turbocharger, and turbocharger speed (TRBSPD) of the turbocharger. A specific design limit of a turbocharger is a choke line, which often represents a threshold limit in the air flow rate or pressure ratio between a compressor inlet and exit due to design constraints in the size of inlets, outlets, passages, and so forth. These engine parameters (e.g., PFP, PTT, and TRBSPD) should be maintained within design limits to avoid failure of the engine power assembly and turbocharger. Also, the compressor choke condition should be avoided to reduce the possibility of turbocharger failure.

Unfortunately, each engine is typically designed to work with a single specific fuel. Thus, any change in the fuel for these engines would result in a variety of problems and potential damage due to the different fuel characteristics, such as viscosity, compressibility, density, lower heating value (LHV), and so forth. For example, the different fuel characteristics may have a negative impact on the engine performance, fuel efficiency, and exhaust pollutants. Even worse, the different fuel characteristics may cause one or more engine components or parameters to exceed their design limits, thereby potentially causing damage and downtime. In one example, a fuel having a lower compressibility and a higher viscosity than a fuel intended for the engine would likely lead to a higher maximum fuel injection pressure, which could lead to failure of components in the fuel injection system if design limits are exceeded. In another example, a fuel having a smaller lower heating value (LHV) than a fuel intended for the engine would likely lead to greater fueling injected per stroke, thereby leading to higher injection and combustion durations. As a result, the smaller lower heating value (LHV) would likely cause a higher specific fuel consumption (SFC) and, thus, a higher fueling cost. These are merely some examples of the effects of utilizing a different fuel than intended for the particular engine.

BRIEF DESCRIPTION

A method, in certain embodiments, includes controlling a first parameter set (e.g., fuel injection timing, engine speed, etc.) of an engine to reduce specific fuel consumption to account for a plurality of different fuels alone or in combination with one another. The method also may include controlling a second parameter set (e.g., engine duration, engine speed, manifold air pressure, fuel supply temperature, fuel supply pressure, etc.) of the engine to reduce the possibility of exceeding design limits associated with the engine to account for the plurality of different fuels alone or in combination with one another.

DRAWINGS

These and other features, aspects, and advantages of the present invention will become better understood when the following detailed description is read with reference to the accompanying drawings in which like characters represent like parts throughout the drawings, wherein.

Figure 8:
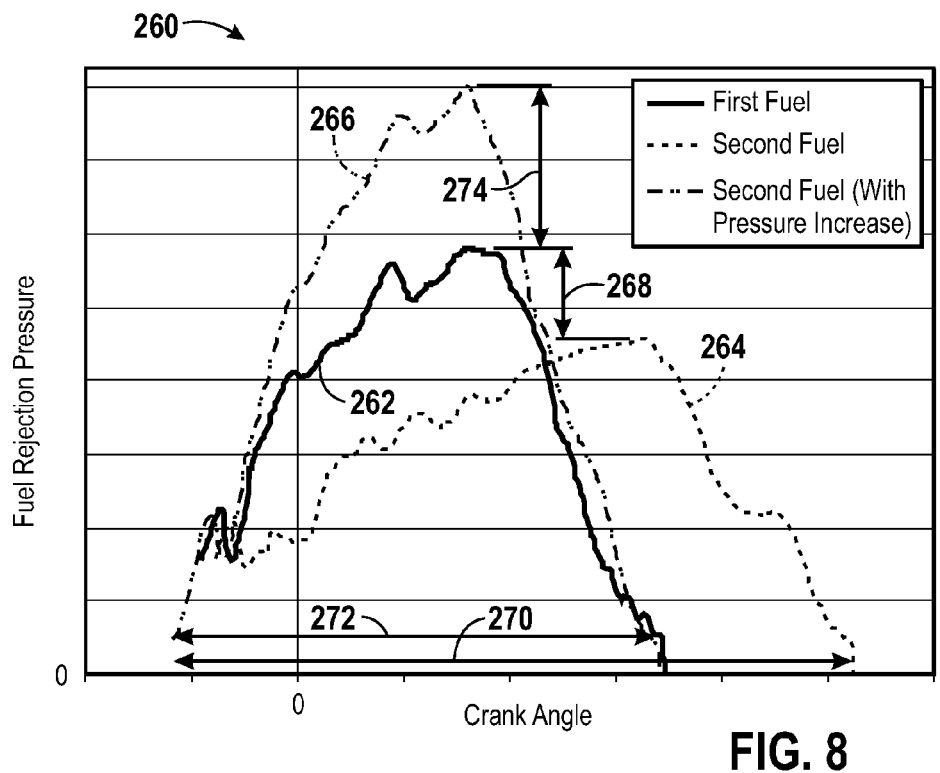
Figure 9:
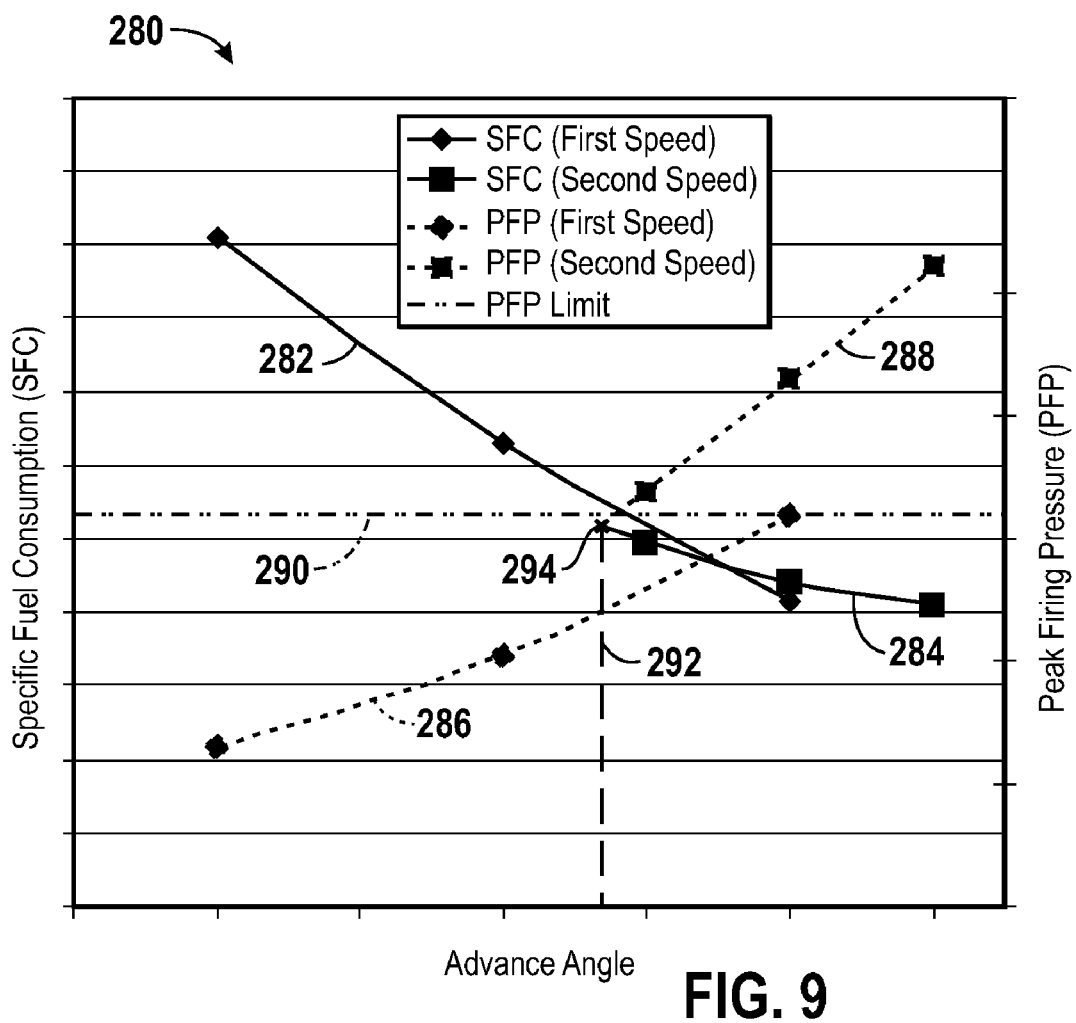

FIG. 8 is a graph of fuel injection pressure versus crank angle of different fuels illustrating the effects of increasing the fuel injection pressure on the fuel injection duration in accordance with certain embodiments of the present technique; and FIG. 9 is a graph of specific fuel consumption (SFC) and peak firing pressure (PFP) versus advance angle of an engine for different speeds in accordance with certain embodiments of the present technique.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
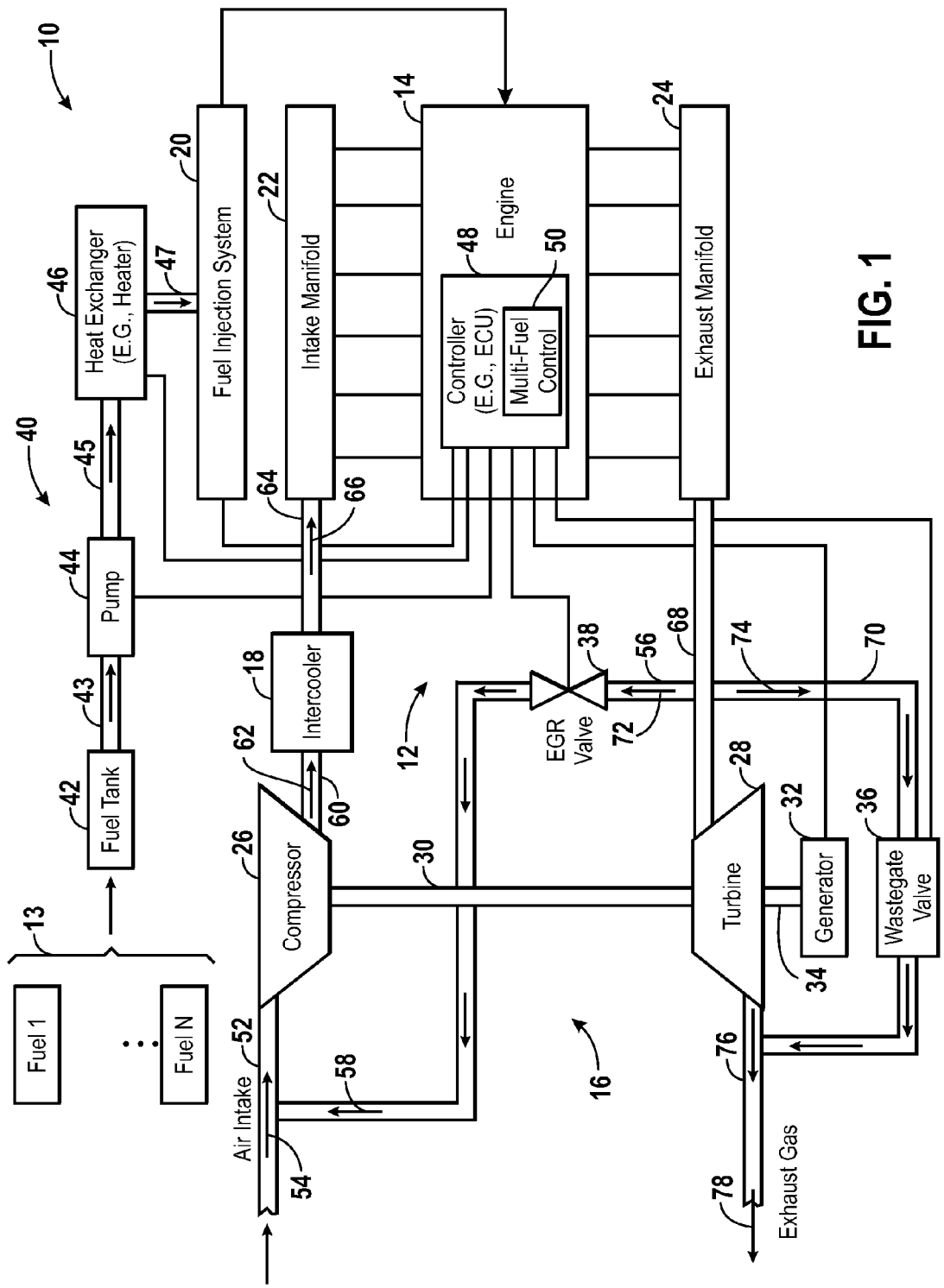
FIG. 1 is a block diagram illustrating a system having a multi-fuel control system coupled to a turbocharged engine in accordance with certain embodiments of the present technique.

FIG. 1 is a block diagram of a system 10 having a multi-fuel control system 12 coupled to a turbocharged engine 14 in accordance with certain embodiments of the present technique. As discussed in detail below, the multi-fuel control system 12 is configured to adjust various engine parameters to account for the effects of different fuel characteristics, thereby enabling the turbocharged engine 14 to operate with a plurality of different fuels rather than being limited to a single specific fuel. The system 10 may include a vehicle, such as a locomotive, an automobile, a bus, or a marine vessel. Alternatively, the system 10 may include a stationary system, such as a power generation system having the engine 14 coupled to a generator. The illustrated engine 14 is a compression-ignition engine, such as a diesel engine. However, other embodiments of the engine 14 include a spark-ignition engine, such as a gasoline-powered internal combustion engine.

In each of these embodiments, the multi-fuel control system 12 is configured to maintain engine operating parameters within acceptable limits with an improvement in the specific fuel consumption for a variety of different fuels 13, such that the system 10 is not limited to operation with one specific fuel. For example, in certain embodiments, the multi-fuel control system 12 is configured to reduce specific fuel consumption (SFC) while maintaining peak firing pressure (PFP), turbospeed (TRBSPD), pre-turbine temperature (PTT), and maximum fuel injection pressure ($P_{INJMAX}$) within acceptable limits (e.g., maximum design limits) in response to use of the different fuels 13. In other words, the system 10 may be described as fuel independent as a result of the multi-fuel control system 12. For example, the multi-fuel control system 12 may enable the system 10 to operate with a variety of standard and alternative fuels 13, such as gasoline, diesel fuel, marine fuel, vegetable oils, biodiesel fuels, and so forth. As discussed in detail below, the multi-fuel control system 12 may utilize a variety of control schemes to account for the effects of different fuel characteristics, e.g., viscosity, compressibility, density, lower heating value (LHV), and so forth. In addition, certain embodiments of the system 12 simultaneously control various parameters to reduce exhaust emissions, such as nitrogen oxides, particulate matter, hydrocarbons, carbon monoxide, or a combination thereof.

As illustrated, the system 10 includes a turbocharger 16, an intercooler 18, a fuel injection system 20, an intake manifold 22, and an exhaust manifold 24. The illustrated turbocharger 16 includes a compressor 26 coupled to a turbine 28 via a drive shaft 30. The system 10 also includes an electrical generator 32 coupled to the turbine 28 via a shaft 34. In addition, the system 10 includes a wastegate valve 36 and an exhaust gas recirculation (EGR) valve 38 disposed downstream from the exhaust manifold 24. In the illustrated embodiment, the wastegate valve 36 is disposed between an upstream side and a downstream side of the turbine 28. The illustrated EGR valve 38 is disposed downstream from the exhaust manifold 24 and upstream from the compressor 26. As discussed in further detail below, the generator 32, the wastegate valve 36, and/or the EGR valve 38 may be selectively engaged to control parameters of the system 10 to account for different fuel characteristics. For example, the electrical generator 32 and/or the wastegate valve 36 may be selectively engaged to reduce the speed of the turbine 28, thereby reducing the speed of the compressor 26, reducing the manifold air pressure (MAP), providing a richer fuel/air mixture, and decreasing the peak firing pressure (PFP). Similarly, the EGR valve 38 may be selectively engaged to reduce the speed of the turbine 28, while also adding heat and recirculating a portion of the exhaust gases into the air intake.

The illustrated system 10 further includes a fuel supply system 40 coupled to the fuel injection system 20. The fuel supply system 40 includes a fuel tank 42, a fuel pump 44, a heat exchanger 46, and associated conduits 43, 45, and 47 leading to the fuel injection system 20. In certain embodiments, the heat exchanger 46 may include a heater, a cooler, or a combination thereof. For example, in one embodiment, the heat exchanger 46 may use the heat of the exhaust gas (or other engine heat) to heat the fuel. As discussed further below, the fuel pump 44 and the heat exchanger 46 may be used to vary the fuel supply pressure and the fuel supply temperature to account for different fuel characteristics. For example, if the fuel is more viscous than an originally intended fuel, then the multi-fuel control system 12 may engage the heat exchanger 46 to increase the fuel supply temperature to reduce the viscosity and fuel injection pressure. By further example, the multi-fuel control system 12 may engage the fuel pump 44 to increase the fuel supply pressure to reduce the fuel injection duration. In either case, the multi-fuel control system 12 may control the pump 44 and the heat exchanger 46 to maintain the maximum fuel injection pressure ($P_{INJMAX}$) within design limits, while also improving the specific fuel consumption (SFC). The control of the pump 44 and the heat exchanger 46 also may be used to control the fuel injection in a manner that changes the fuel/air mixture, combustion duration, peak firing pressure (PFP), peak firing temperature (PTT), pollutants, and so forth.

The system 10 also includes a controller 48, e.g., an electronic control unit (ECU), having a multi-fuel control 50 as part of the multi-fuel control system 12. The controller 48 is coupled to various sensors and components throughout the system 10, such that the multi-fuel control 50 (and the control system 12 as a whole) can respond to the effects of different fuels 13 used in the engine 14. More specifically, as discussed further below, the multi-fuel control 50 is configured to sense various parameters to identify possible critical conditions (e.g., approaching or exceeding limits) and take corrective actions to avoid such critical conditions. However, in the absence of critical conditions, the multi-fuel control 50 is configured to improve specific fuel consumption (SFC). For example, in the illustrated embodiment, the controller 48 is coupled to and configured to control the pump 44, the heat exchanger 46, the fuel injection system 20, the EGR valve 38, the generator 32, and the wastegate valve 36. However, the controller 48 may be coupled to sensors and control features of each illustrated component of the system 10 among many others.

In various embodiments, the sensors may include fuel sensors, fuel injection sensors, engine intake sensors, engine combustion sensors, engine exhaust sensors, turbocharger sensors, and so forth. The fuel sensors may include a fuel supply pressure sensor, a fuel supply temperature sensor, and a fuel supply type sensor. The fuel injection sensors may include a fuel injection pressure sensor, a fuel injection flow rate sensor, a fuel injection timing sensor, and a fuel injection duration sensor. The engine intake sensors may include an air intake temperature sensor and an air intake pressure sensor. The engine exhaust sensors may include an exhaust temperature sensor, an exhaust pressure sensor, and exhaust pollutant sensors. The engine combustion sensors may include a peak firing pressure (PFP) sensor and a peak firing temperature (PFT) sensor to detect peak conditions within a combustion chamber of the engine 14. The turbocharger sensors may include temperature sensors, pressure sensors, and speed sensors for both the compressor 26 and the turbine 28.

In the illustrated embodiment of FIG. 1, the system 10 intakes air into the compressor 26 through a conduit 52 as illustrated by arrow 54. In addition, as discussed further below, the compressor 26 may intake a portion of the exhaust from the exhaust manifold 24 though a conduit 56 via control of the EGR valve 38 as indicated by arrow 58. In turn, the compressor 26 compresses the intake air and the portion of the engine exhaust and outputs the compressed gas to the intercooler 18 via a conduit 60 as indicated by arrow 62. The intercooler 18 functions as a heat exchanger to remove heat from the compressed gas as a result of the compression process. As appreciated, the compression process typically heats up the intake air and the portion of exhaust gas, and thus is cooled prior to intake into the intake manifold 22. As further illustrated, the compressed and cooled air passes from the intercooler 18 to the intake manifold 22 via a conduit 64 as indicated by arrow 66.

The intake manifold 22 then routes the compressed gas into the engine 14. In addition, the fuel supply system 40 provides one of the different fuels 13 to the fuel injection system 20, which in turn injects the fuel directly into the cylinders of the respective piston cylinder assemblies of the engine 14. The engine 14 then compresses this mixture of fuel, exhaust gas, and air within various piston cylinder assemblies, e.g., 4, 6, 8, 10, 12, or 16 piston cylinder assemblies. The controller 48 may control the fuel injection timing of the fuel injection system 20, such that the fuel is injected at the appropriate time into the engine 14.

In addition, in response to changes in the fuel (e.g., different fuel characteristics), the multi-fuel control 50 may adjust the fuel injection timing, the fuel injection duration, the fuel supply pressure, the fuel supply temperature, the fuel injection flow rate, or the like. For example, as mentioned above, the controller 48 may adjust the fuel supply pressure and/or the fuel supply temperature via control of the pump 44 and/or heat exchanger 46. These adjustments may account for different fuel characteristics, such as viscosity, compressibility, density, lower heating value (LHV), and so forth. For example, in certain embodiments, the multi-fuel control 50 may include a control feature configured to adjust a fuel supply temperature, a fuel supply pressure, or a combination thereof, to control a maximum fuel injection pressure. More specifically, the control feature may be configured to increase the fuel supply temperature, decrease the fuel supply pressure, or a combination thereof, if the maximum fuel injection pressure is greater than a pressure design limit. The control feature also may be configured to decrease the fuel supply temperature, increase the fuel supply pressure, or a combination thereof, if the maximum fuel injection pressure is not greater than the pressure design limit.

If the engine 14 is a compression-ignition engine, then the heat of the compressed air ignites the fuel as each piston compresses a volume within its corresponding cylinder. If the engine 14 is a spark-ignition engine, then a spark ignites the fuel as each piston compresses a volume within its corresponding cylinder. In either case, the combustion of the fuel leads to the peak firing pressure (PFP) and peak firing temperature (PFT) within the volume between each piston and its corresponding cylinder. As discussed further below, a change in the fuel (e.g., different fuel characteristics) can cause changes in the combustion process, including increases or decreases in the peak firing pressure (PFP) and peak firing temperature (PFT).

The multi-fuel control 50 can adjust a variety of parameters to account for these changes in the combustion process, thereby maintaining the combustion process within design limits while also minimizing specific fuel consumption (SFC). For example, the multi-fuel control 50 may include a control feature configured to adjust a fuel injection timing, an engine speed, or a combination thereof, to control the specific fuel consumption (SFC) and the peak firing pressure (PFP) of the engine 14. More specifically, the control feature may be configured to advance the fuel injection timing, reduce the engine speed, or a combination thereof, to reduce the specific fuel consumption (SFC) if the peak firing pressure (PFP) is not greater than a design limit. The control feature also may be configured to retard the fuel injection timing if the peak firing pressure (PFP) is greater than the design limit.

In turn, the engine 14 exhausts the products of combustion from the various piston cylinder assemblies through the exhaust manifold 24. The exhaust from the engine 14 then passes through the conduit 68 from the exhaust manifold 24 to the turbine 28. The exhaust gas drives the turbine 28, such that the turbine 28 rotates the shaft 30 and drives the compressor 26. The speed of both the turbine 28 and the compressor 26 depends on the pressure and flow rate of exhaust gas. In certain conditions, the system 10 diverts a portion of the exhaust gas away from the turbine 28 via the conduit 56 to the EGR valve 38 and/or a conduit 70 to the wastegate valve 36, as illustrated by arrows 72 and 74, respectively. As a result, the diversion of exhaust gas causes a decrease in speed of both the turbine 28 and its driven compressor 26. As discussed further below, this exhaust gas diversion may be employed to reduce the turbospeed, reduce the manifold air pressure (MAP), provide a richer fuel/air mixture, and reduce the peak firing pressure (PFP) to account for different fuel characteristics. In addition, the generator 32 may be employed to add a load onto the turbine 28, thereby effectively reducing the turbospeed with similar results to account for different fuel characteristics. Eventually, the exhaust gas passes out of the turbine 28 and the wastegate valve 36 via conduit 76, as indicated by arrow 78.

Figure 2:
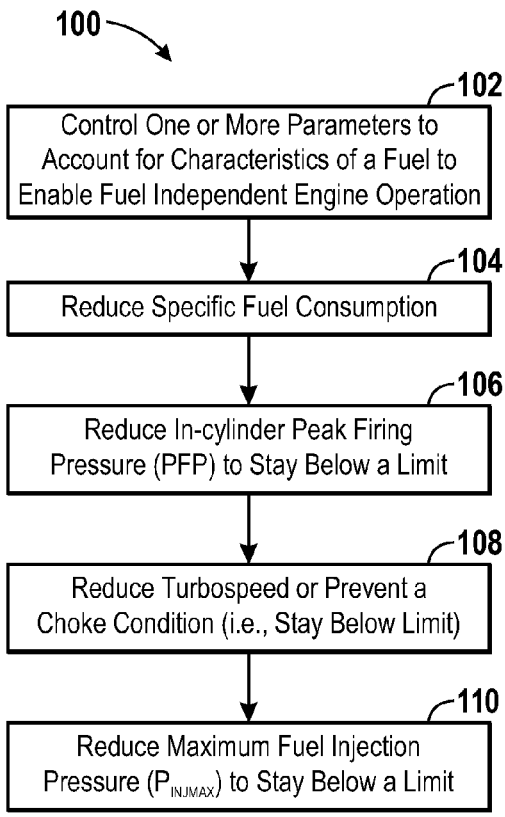
FIGS. 2-4 are flow charts illustrating various processes of operating a turbocharged engine for use with a plurality of different fuels in accordance with certain embodiments of the present technique.

FIG. 2 is a flowchart illustrating a process 100 for operating an engine with different types of fuels in accordance with certain embodiments of the present technique. In certain embodiments, the process 100 may be a computer-implemented process, e.g., executable on the multi-fuel control 50 of the controller 48 as illustrated in FIG. 1. Thus, the process 100 may include various code, instructions, lookup tables, databases, and the like, disposed on a computer-readable medium, such as memory of the multi-fuel control 50. In addition, the multi-fuel control 50 may implement the process 100 at least partially by interfacing with a plurality of sensors distributed throughout the system 10. For example, the multi-fuel control 50 may receive operational data from sensors distributed throughout the engine 14, the turbocharger 16, the fuel injection system 20, the fuel supply system 40, the intake manifold 22, the exhaust manifold 24, the exhaust lines, and the like. Thus, the multi-fuel-control 50 may implement the process 100 by acquiring real-time operational data from the system 10, evaluating the data against stored data (e.g., databases, lookup tables, design limits, equations, etc.), and outputting appropriate control signals to the components in the system 10. For example, as discussed in detail below, the multi-fuel-control 50 may implement the process 100 to reduce exhaust emissions, reduce specific fuel consumption (SFC), and maintain the components within design limits for any selected fuel.

As illustrated, the process 100 includes control of one or more parameters to account for characteristics of a fuel to enable fuel independent engine operation (block 102). For example, block 102 may include control steps to account for viscosity, compressibility, density, lower heating value (LHV), among other fuel characteristics. Thus, block 102 may include changing the fuel supply temperature, the fuel supply pressure, the fuel supply flow rate, or a combination thereof. The process 100 also includes a control block 104 to reduce specific fuel consumption (SFC). In certain embodiments, the control block 104 also may control various parameters to reduce one or more emission parameters, such as nitrogen oxides, particulate matter, hydrocarbons, carbon monoxide, or a combination thereof. The process 100 further includes a control block 106 to reduce an in-cylinder peak firing pressure (PFP) to stay below a limit. At control block 108, the process 100 may reduce a turbospeed (TRBSPD) and/or prevent a choke condition (i.e., stay below a limit). At control block 110, the process 100 may reduce a maximum fuel injection pressure ($P_{INJMAX}$) to stay below a limit. In certain embodiments, the control blocks 104, 106, 108, and 110 are interrelated with one another and the initial control block 102. In other words, a variety of control measures may be taken to control the SFC, PFP, TRBSPD, and $P_{INJMAX}$, alone or in combination with one another.

These control measures may include control of the fuel supply system 40, the fuel injection system 20, the turbocharger 16, and so forth. For example, as mentioned above, the control measures may include increasing or decreasing the fuel supply temperature, the fuel supply pressure, the fuel supply flow rate, or a combination thereof, via control of the pump 44 and the heat exchanger 46. In certain embodiments, the change in temperature, pressure, and flow rate causes a change in the pressure, duration, and quantity of fuel during a fuel injection, thereby altering the fuel/air mixture, the combustion duration, the peak firing pressure (PFP), and so forth. The control measures also may include advancing or retarding the fuel injection timing (e.g., advance angle) relative to the top dead center (TDC) position of the piston in the cylinder. In certain embodiments, the control measures may advance fuel injection timing to reduce the specific fuel consumption (SFC) and/or increase the peak firing pressure (PFP). Alternatively, the control measures may retard fuel injection timing to reduce the peak firing pressure (PFP) to stay within the design limits. By further example, the control measures may include diverting exhaust from the turbine 28 via the wastegate valve 36 and/or the EGR valve 38, thereby reducing the TRBSPD, reducing the manifold air pressure (MAP), increasing the fuel/air mixture (i.e., more fuel per air), and reducing the peak firing pressure (PFP). The control measures also may include engaging the electrical generator 32 to add a load onto the turbine 28, thereby reducing the TRBSPD, reducing the manifold air pressure (MAP), increasing the fuel/air mixture (i.e., more fuel per air), and reducing the peak firing pressure (PFP). Alternatively, the control measures may reduce the diversion of exhaust gases and/or disengage the generator 32 to provide the opposite results. Again, a variety of control measures may be taken to maintain parameters within design limits, while also generally reducing specific fuel consumption (SFC) for each different fuel used with the engine.

Figure 3:
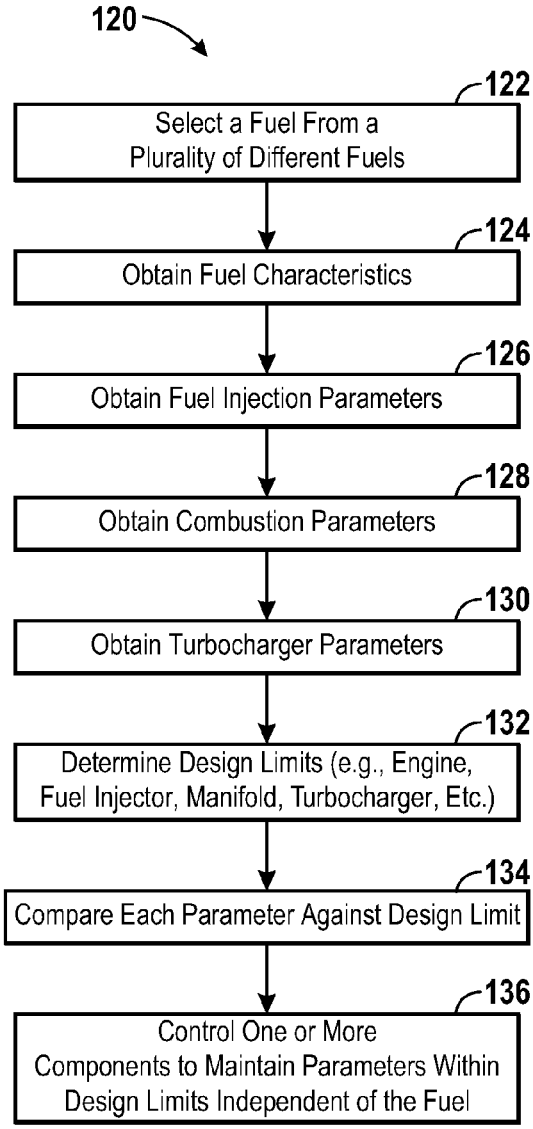

FIG. 3 is a flow chart illustrating a process 120 of operating an engine with a plurality of different fuels in accordance with certain embodiments of the present technique. In certain embodiments, the process 120 may be a computer-implemented process, e.g., executable on the multi-fuel control 50 of the controller 48 as illustrated in FIG. 1. Thus, the process 120 may include various code, instructions, lookup tables, databases, and the like, disposed on a computer-readable medium, such as memory of the multi-fuel control 50. In addition, the multi-fuel control 50 may implement the process 120 at least partially by interfacing with a plurality of sensors distributed throughout the system 10. For example, the multi-fuel control 50 may receive operational data from sensors distributed throughout the engine 14, the turbocharger 16, the fuel injection system 20, the fuel supply system 40, the intake manifold 22, the exhaust manifold 24, the exhaust lines, and the like. Thus, the multi-fuel-control 50 may implement the process 120 by acquiring real-time operational data from the system 10, evaluating the data against stored data (e.g., databases, lookup tables, design limits, equations, etc.), and outputting appropriate control signals to the components in the system 10. For example, as discussed in detail below, the multi-fuel-control 50 may implement the process 120 to reduce exhaust emissions, reduce specific fuel consumption (SFC), and maintain the components within design limits for any selected fuel.

As illustrated, the process includes a first control block 122 to select a fuel from a plurality of different fuels, such as diesel, gasoline, marine fuel, vegetable oils, biodiesel fuels, and so forth. The process 120 also includes control blocks 124, 126, 128, and 130 to acquire various parameters and characteristics to control the engine in response to the selected fuel. Again, as mentioned above, these various parameters may be acquired from at least one of a database, a lookup table, a sensor, or the like. Thus, the acquired data may correspond to previously stored data as well as real-time operation data.

For example, block 124 obtains fuel characteristics such as viscosity, compressibility, density, and lower heating value (LHV). Block 126 obtains fuel injection parameters, such as fuel injection timing, fuel injection pressure, fuel injection temperature, fuel injection flow rate, fuel injection duration, and so forth. Block 128 obtains combustion parameters, such as peak firing pressure (PFP), peak firing temperature (PFT), combustion duration, and so forth. Block 130 obtains turbocharger parameters, such as turbospeed, inlet and outlet temperatures, inlet and outlet pressures, and other desired parameters, of the compressor 26, the turbine 28, or both. At block 132, the process 120 proceeds to determine design limits, such as engine design limits, fuel injector design limits, manifold design limits, turbocharger design limits, and so forth. For example, the design limits may correspond to peak pressures, peak temperatures, peak speeds, and so forth. At block 134, the process 120 compares each parameter against a corresponding design limit. For example, block 134 may compare an actual peak firing pressure (PFP) against a design limit. Similarly, block 134 may compare an actual turbospeed against a design limit. Furthermore, block 134 may compare an actual maximum fuel injection pressure against a design limit. These are merely examples of potential comparisons of parameters with their respective design limit, and should not be limiting on the disclosed embodiments. At block 136, the process proceeds to control one or more components to maintain parameters within design limits independent of the fuel. Again, as discussed above with reference to FIG. 2, the process 120 may adjust a variety of operational parameters to control the SFC, PFP, TRBSPD, and $P_{INJMAX}$, alone or in combination with one another.

Figure 4:
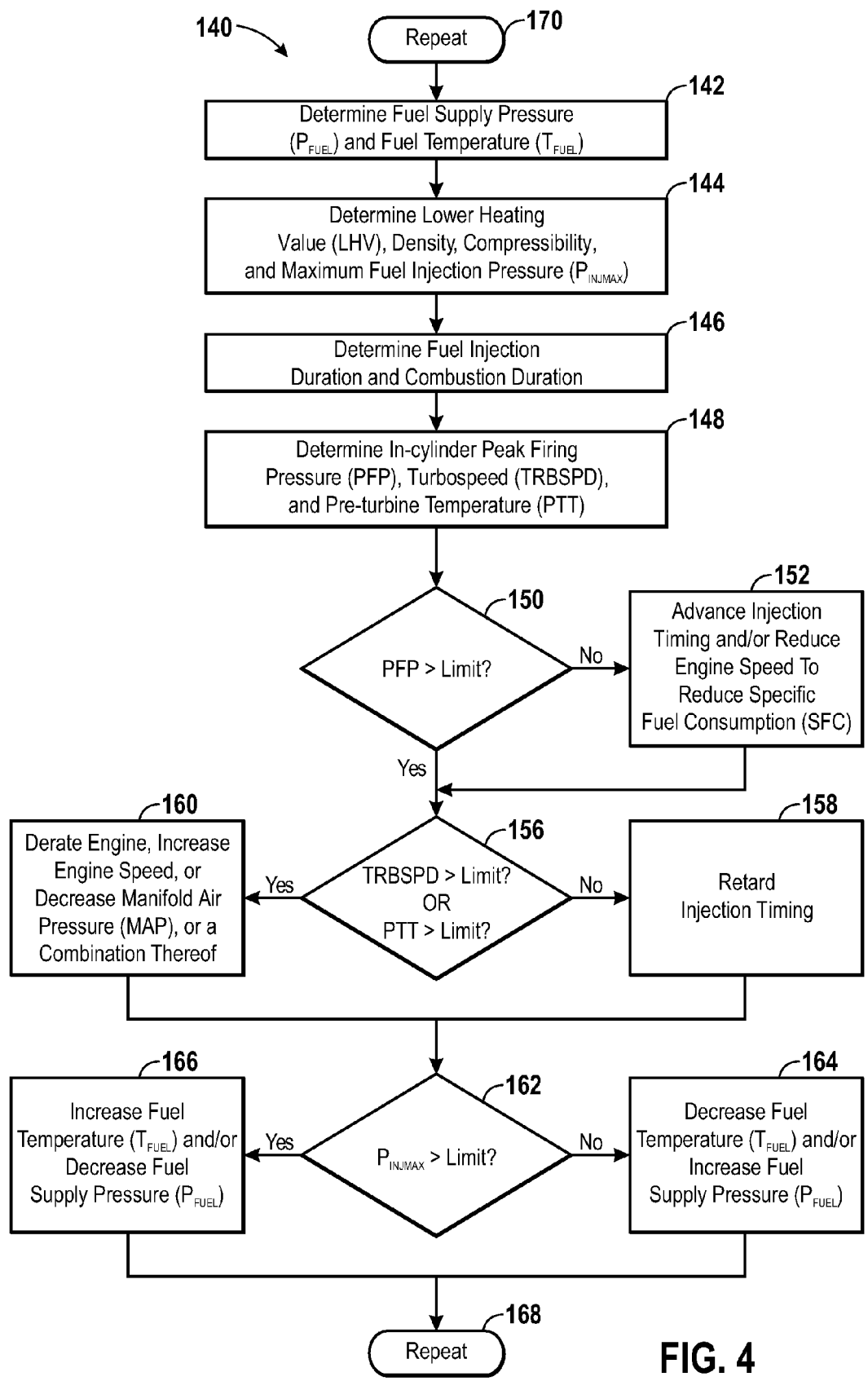

FIG. 4 is a flow chart illustrating a process 140 of operating an engine to account for the effects of changing fuels in an engine in accordance with certain embodiments of the present technique. In certain embodiments, the process 140 may be a computer-implemented process, e.g., executable on the multi-fuel control 50 of the controller 48 as illustrated in FIG. 1. Thus, the process 140 may include various code, instructions, lookup tables, databases, and the like, disposed on a computer-readable medium, such as memory of the multi-fuel control 50. In addition, the multi-fuel control 50 may implement the process 140 at least partially by interfacing with a plurality of sensors distributed throughout the system 10. For example, the multi-fuel control 50 may receive operational data from sensors distributed throughout the engine 14, the turbocharger 16, the fuel injection system 20, the fuel supply system 40, the intake manifold 22, the exhaust manifold 24, the exhaust lines, and the like. Thus, the multi-fuel-control 50 may implement the process 140 by acquiring real-time operational data from the system 10, evaluating the data against stored data (e.g., databases, lookup tables, design limits, equations, etc.), and outputting appropriate control signals to the components in the system 10. For example, as discussed in detail below, the multi-fuel-control 50 may implement the process 140 to reduce exhaust emissions, reduce specific fuel consumption (SFC), and maintain the components within design limits for any selected fuel.

As illustrated, the process 140 includes a control block 142 to determine fuel supply pressure ($P_{FUEL}$) and fuel temperature ($T_{FUEL}$). For example, the control block 142 may include monitoring a fuel pressure sensor and a fuel temperature sensor in the fuel supply system 40 as illustrated in FIG. 1. The process 140 also includes a control block 144 to determine a lower heating value (LHV), a density, a compressibility, and a maximum fuel injection pressure ($P_{INJMAX}$). In certain embodiments, the control block 144 may automatically sense a fuel type and access the fuel characteristics from a lookup table. In other embodiments, the process 140 may include user input to acquire the fuel characteristics. For example, a user may enter or select a fuel type, such that the fuel characteristics can be retrieved from a lookup table. In addition, the control block 144 may sense or monitor one or more of the fuel characteristics, such as the maximum fuel injection pressure ($P_{INJMAX}$) during operation of the engine. The process 140 also includes a control block 146 to determine a fuel injection duration and a combustion duration. For example, the control block 146 may include sensors to calculate a beginning, an end, and thus a duration of the fuel injection and the combustion. In certain embodiments, the control block 146 may estimate the fuel injection duration and/or the combustion duration based on other parameters, such as stored data, sensed data, equations, and so forth. At control block 148, the process 140 proceeds to determine an in-cylinder peak firing pressure (PFP), a turbospeed (TRBSPD), and a pre-turbine temperature (PTT). Again, the control block 148 may include a pressure sensor, a speed sensor, and a temperature sensor to monitor and acquire each of these values during operation of the engine.

At query block 150, the process evaluates whether the peak firing pressure (PFP) is greater than a limit. If the peak firing pressure is not greater than the limit at block 150, then the process 140 proceeds to advance injection timing and/or reduce engine speed to reduce the specific fuel consumption (SFC) at control block 152. In addition to reducing the specific fuel consumption (SFC) at control block 152, the above control measures may cause an increase in the peak firing pressure (PFP). If the peak firing pressure is greater than the limit at block 150, then the process 140 proceeds to query block 156 to evaluate additional parameters against respective limits. At query block 156, the process 140 evaluates whether or not the turbospeed (TRBSPD) is greater than a limit or the pre-turbine temperature (PTT) is greater than a limit. If these limits are not exceeded at query block 156, then the process 140 proceeds to retard the injection timing at control block 158. By retarding the injection timing, the control block 158 reduces the peak firing pressure (PFP). As appreciated, in certain embodiments, this control block 158 may be performed directly in response to query block 150 when the peak firing pressure (PFP) is greater than a limit.

If the turbospeed (TRBSPD) is greater than a limit or the pre-turbine temperature (PTT) is greater than a limit at query block 156, then the process 140 proceeds to derate the engine, increase the engine speed, or decrease manifold air pressure (MAP), or a combination thereof, at control block 160. For example, as discussed above, the control block 160 may reduce the speed of the turbocharger 16 (TRBSPD) by diverting exhaust gases via the wastegate valve 36 and/or the EGR valve 38, or by adding a load via the generator 32, or a combination thereof. In turn, the reduced speed of the turbocharger 16 may cause a decrease in the manifold air pressure (MAP), an increase in the fuel/air mixture (i.e., more fuel per air), and so forth. Furthermore, in certain embodiments, the process 140 may provide control measures opposite from block 160 if the limits are not exceeded at query block 156, thereby supplementing or replacing the control measures shown in the control block 158.

The process 140 then proceeds to query block 162 for an evaluation of fuel injection characteristics. At query block 162, the process 140 evaluates whether or not the maximum fuel injection pressure ($P_{INJMAX}$) is greater than a limit. If the limit is not exceeded at query block 162, then the process 140 proceeds to decrease a fuel temperature ($T_{FUEL}$) and/or increase a fuel supply pressure ($P_{FUEL}$) at block 164. Otherwise, if the limit is exceeded at query block 162, then the process 140 proceeds to increase the fuel temperature and/or decrease the fuel supply pressure at control block 166. At this point, the process 140 of the illustrated embodiment repeats as illustrated by blocks 168 and 170.

Figure 5:
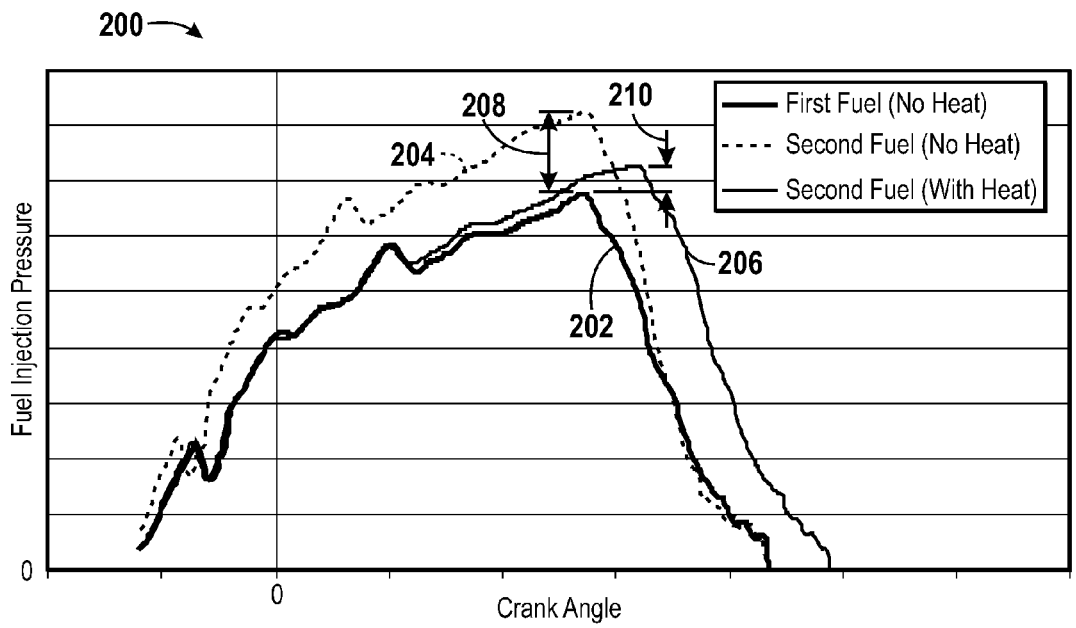
FIG. 5 is a graph of fuel injection pressure versus crank angle of different fuels illustrating the effects of heating the fuel to reduce the fuel injection pressure in accordance with certain embodiments of the present technique.

FIG. 5 is a graph 200 of fuel injection pressure versus crank angle for different fuels illustrating the effects of heating the fuel on the fuel injection pressure in accordance with certain embodiments of the present technique. As illustrated, plot 202 illustrates a first fuel without any heating, for example, by the heat exchanger 46 of FIG. 1. Plots 204 and 206 illustrate a second fuel different from the first fuel, wherein plot 204 illustrates the fuel without heating and plot 206 illustrates the fuel with heating (e.g., 100 degrees Celsius). In the illustrated embodiment, the first fuel may include a diesel fuel, such as diesel fuel (e.g., DF2), whereas the second fuel may include a vegetable oil such as palm oil. As illustrated by comparison of plot 202 and 204, the second fuel has a substantially greater maximum fuel injection pressure ($P_{INJMAX}$) relative to the first fuel as illustrated by arrow 208. However, without heating, both the first and second fuels have very similar fuel injection durations as illustrated by the plots 202 and 204.

With heating (e.g., 100 degrees Celsius), the second fuel has a substantially reduced maximum fuel injection pressure ($P_{INJMAX}$), which is closer to that of the first fuel as indicated by arrow 210. Thus, as illustrated by the graph 200, the second fuel may be heated in accordance with one of the previously described multi-fuel control systems or methods to reduce the maximum fuel injection pressure ($P_{INJMAX}$) to stay within design limits in accordance with certain embodiments of the present technique.

Figure 6:
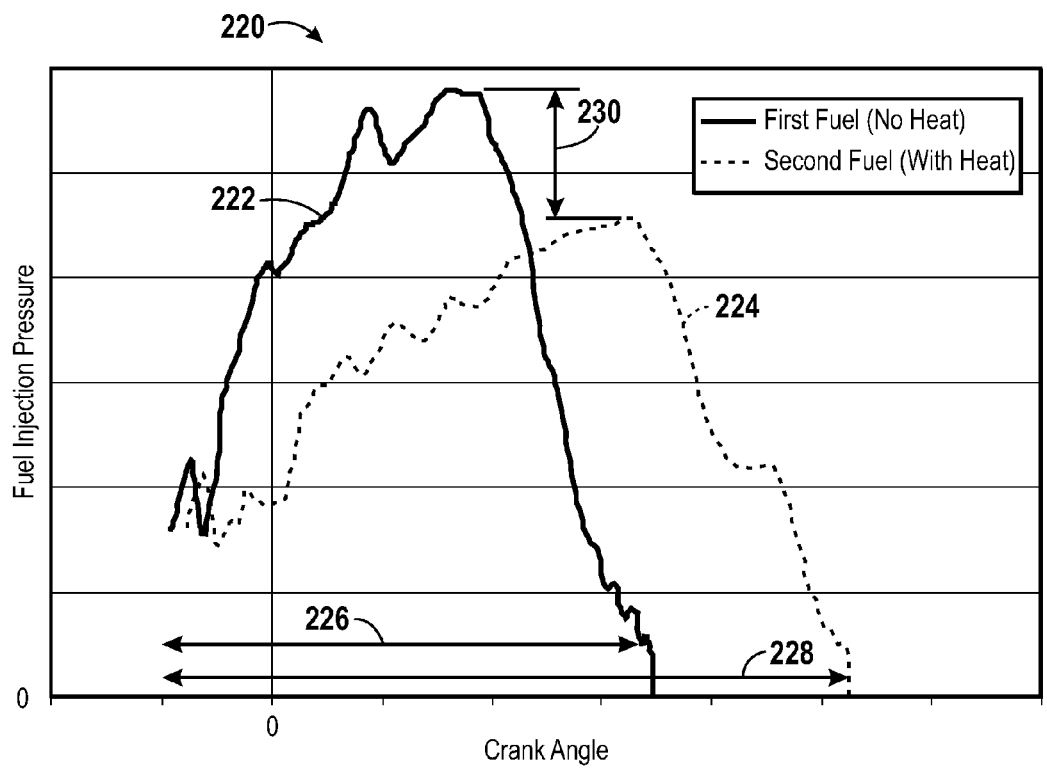
FIG. 6 is a graph of fuel injection pressure versus crank angle of different fuels illustrating the effects of heating the fuel on the fuel injection duration in accordance with certain embodiments of the present technique.

FIG. 6 is a graph 220 of fuel injection pressure versus crank angle for different fuels illustrating the effects of heating the fuel on the fuel injection duration in accordance with certain embodiments of the present technique. In the illustrated embodiment, plot 222 corresponds to a first fuel without heating, while plot 224 illustrates a second fuel with even more heating than described above. Again, similar to the embodiment discussed above with reference to FIG. 5, the first fuel may correspond to a diesel fuel (e.g., DF2), and the second fuel may correspond to a vegetable oil such as palm oil. In the illustrated embodiment, the second fuel may be heated to more than 100 degrees Celsius, although the second fuel may be heated to a greater or lesser temperature depending on the fuel characteristics and design limits as described in detail above. As shown, the first fuel of plot 222 has a fuel injection duration as indicated by arrow 226, while the second fuel of plot 224 has a fuel injection duration indicated by arrow 228. The illustrated fuel injection duration 228 of the heated second fuel 224 is greater than the fuel injection duration 226 of the unheated first fuel 222. However, the heated second fuel of plot 224 has a lower maximum fuel injection pressure ($P_{INJMAX}$) than the unheated first fuel of plot 222, as indicated by arrow 230. This is due to second fuel being heated more than necessary. As a result, the fuel heating associated with the previously described multi-fuel control systems and methods resulted in a lower maximum fuel injection pressure ($P_{INJMAX}$) and a greater fuel injection duration in the embodiment of FIG. 6.

Figure 7:
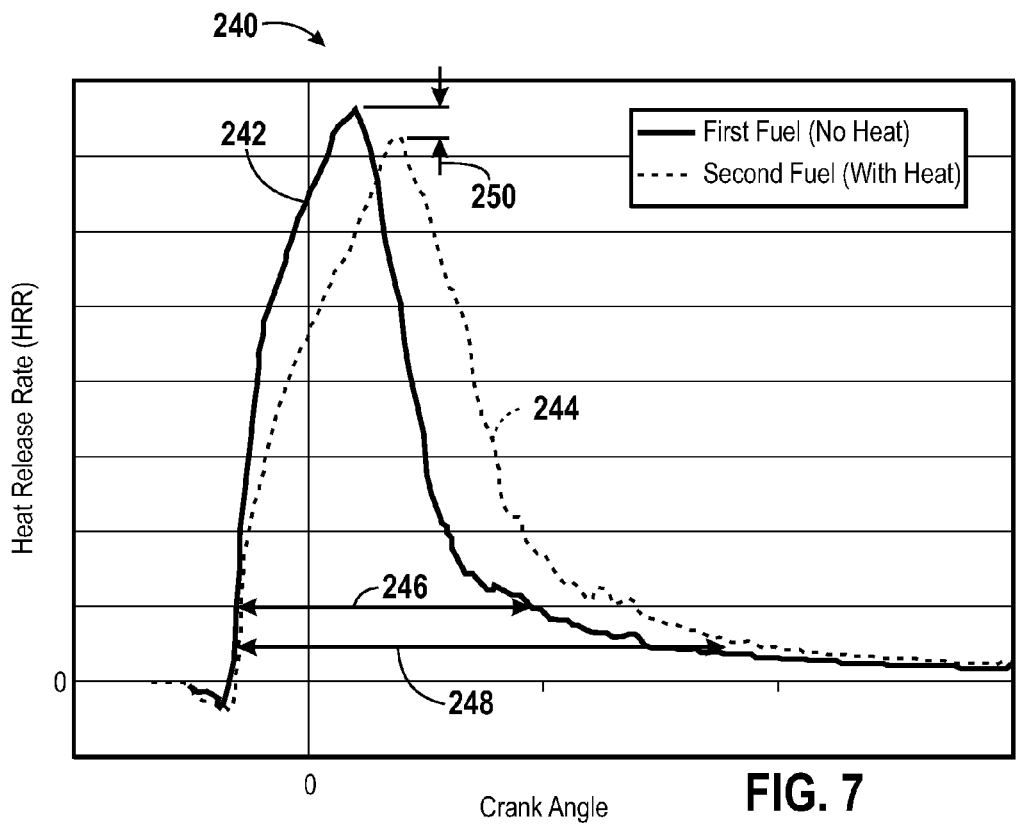
FIG. 7 is a graph of heat release rate versus crank angle for different fuels illustrating the effects of heating the fuel on the combustion duration in accordance with certain embodiments of the present technique.

FIG. 7 is a graph 240 of heat release rate (HRR) versus crank angle for different fuels illustrating the effects of heating on the combustion duration in accordance with certain embodiments of the present technique. As illustrated, plot 242 corresponds to a first fuel without heating and plot 244 corresponds to a second fuel with heating (e.g., 100 degrees Celsius). Again, similar to the embodiments of FIGS. 5 and 6, the first fuel may include a diesel fuel and the second fuel may include a vegetable oil, such as palm oil. As illustrated in FIG. 7, the heat release rates of the first and second fuels begin at substantially the same crank angle but end at different crank angles as illustrated by the horizontal shift on the right portion of plot 244 relative to the plot 242. The first fuel of the plot 242 has a combustion duration generally illustrated by arrow 246, while the second fuel of the plot 244 has a combustion duration generally illustrated by arrow 248. As illustrated, the combustion duration 248 is generally greater than the combustion duration 246. In addition, the maximum heat release rate of the first fuel of plot 242 is greater than the maximum heat release rate of the second heated fuel of plot 244 as indicated by arrow 250. Again, in accordance with the previously described multi-fuel control systems and methods, the temperature of the second fuel of plot 244 may be varied to change the heat release rate, the combustion duration, and the associated peak firing temperature (PFT) during the combustion process, thereby adapting the second fuel to the limitations of the engine.

FIG. 8 is a graph 260 of fuel injection pressure versus crank angle of different fuels illustrating the effects of fuel supply pressure on the maximum fuel injection pressure ($P_{INJMAX}$) and the fuel injection duration in accordance with certain embodiments of the present technique. As illustrated, the graph 260 includes a plot 262 corresponding to a first fuel and plots 264 and 266 corresponding to a second fuel. Specifically, as discussed in the previous embodiments of FIGS. 5-7, the first fuel may correspond to a diesel fuel, and the second fuel may correspond to a vegetable oil, such as palm oil. In the illustrated embodiment, the plot 264 corresponds to the second fuel without an increase in the fuel supply pressure, for example, by the fuel pump 44 of FIG. 1. In contrast, the plot 266 corresponds to the second fuel with an increase in the fuel supply pressure, e.g., 1600 bar. As illustrated by plots 262 and 264, the second fuel of plot 264 has a relatively lower maximum fuel injection pressure than the first fuel of plot 262, as indicted by arrow 268. However, the second fuel of plot 264 also has a relatively greater fuel injection duration than the first fuel of plot 262 as indicated by arrows 270 and 272, respectively. These differences between the first and second fuels can be changed by varying the fuel supply pressure of the second fuel, as illustrated by the changes between the plots 264 and 266 of the second fuel. With reference to plots 262 and 266, the fuel injection duration of the first and second fuels are substantially the same and the second fuel has a greater maximum fuel injection pressure ($P_{INJMAX}$) than the first fuel as indicated by arrow 274. Thus, in accordance with certain aspects of the previously described multi-fuel control systems and methods, the fuel supply pressure of the second fuel may be increased to both reduce the fuel injection duration and increase the maximum fuel injection pressure ($P_{INJMAX}$) to adapt the second fuel to the design limits of the engine.

FIG. 9 is a graph 280 of specific fuel consumption (SFC) and peak firing pressure (PFP) versus advance angle for different engine speeds of a fuel in accordance with certain embodiments of the present technique. The advance angle may be defined as the angle before top dead center (TDC) at which fuel injection begins. In the graph 280, plots 282 and 284 correspond to the specific fuel consumption (SFC) at first and second engine speeds, respectively. In addition, plots 286 and 288 correspond to the peak firing pressure (PFP) at the first and second engine speeds, respectively. The graph 280 further illustrates a peak firing pressure (PFP) limit, such as a design limit, as indicated by horizontal line 290. In the embodiment of FIG. 9, the fuel illustrated by plots 282, 284, 286, and 288 may correspond to the same second fuel as illustrated in FIGS. 5-8. For example, the fuel may correspond to a vegetable oil, such as palm oil. In general, the plots 282 and 284 illustrate a decrease in the specific fuel consumption (SFC) with an increase in the advance angle. In contrast, the plots 286 and 288 illustrate an increase in the peak firing pressure (PFP) with an increase in the advance angle. As a result, the specific fuel consumption (SCF) and the peak firing pressure (PFP) are inversely proportional relative to one another. At the first speed of the engine, the specific fuel consumption (SFC) is relatively high and the peak firing pressure (PFP) is relatively low as illustrated by plots 282 and 286. However, as mentioned above, an increase in the advance angle causes both an improvement in the specific fuel consumption (SFC) and also an increase in the peak firing pressure (PFP) as illustrated by plots 282 and 286. Unfortunately, the peak firing pressure (PFP) of plot 286 eventually reaches the peak firing pressure (PFP) limit 290.

Accordingly, the previously described multi-fuel control systems and methods may be employed to reduce the engine speed from the first speed to the second speed as represented by plots 284 and 288. As a result of the reduced engine speed, the peak firing pressure (PFP) shifts upward from the plot 286 to the plot 288. However, the graph 280 illustrates that an advance angle 292 may be selected by the control system to provide a substantially reduced specific fuel consumption (SFC) and a peak firing pressure (PFP) close to but below the limit 290, as indicted by an intersection 294 of the plots 284 and 288. In general, FIG. 9 illustrates a variety of adjustments that can be taken to maintain the peak firing pressure (PFP) below the limit 290, while also minimizing the specific fuel consumption (SFC). Again, the previously described multi-fuel control systems and methods may increase the engine speed from the second speed to the first speed, retard the fuel injection timing (i.e., reduce the advance angle), or a combination thereof. Conversely, if the peak firing pressure is below the limit 290, then the previously described multi-fuel control systems and methods may advance the fuel injection timing (i.e., increase the advance angle), or reduce the engine speed from the first speed to the second speed, or a combination thereof. Although graph 280 illustrates exemplary techniques to reduce the specific fuel consumption (SFC) and maintain the peak firing pressure (PFP) below the limit 290, other embodiments of the multi-fuel control system and method may adjust other parameters of the system 10 of FIG. 1 to optimize the engine 14 for the particular fuel.

Technical effects of the disclosed embodiments of the invention include the operability a combustion-engine system (e.g., system 10) with a plurality of different fuels in a controlled manner that reduces exhaust emissions, reduces specific fuel consumption (SFC), and maintains components/parameters within design limits. In other words, the technical effects of the disclosed embodiments of the invention include an engine that is fuel independent, i.e., not limited to one specific fuel. As discussed above, the technical effect of a fuel independent engine may be achieved by making various controls dependent on the fuel characteristics, thereby adjusting operation of the engine to account for the different fuel characteristics to reduce exhaust emissions, reduce specific fuel consumption (SFC), and maintain components/parameters within design limits. The technical effects may be carried out by a computer-implemented method or system, such as illustrated in FIGS. 1-4 and described in detail above. For example, each step, decision block, or the like, as shown in FIGS. 2-4 may correspond to a computer instruction, logic, or software code disposed on a computer readable or machine readable medium. By further example, the computer-implemented methods and/or code may be programmed into an electronic control unit (ECU) of an engine, a main control system of a vehicle (e.g., a locomotive unit), a remote control station that communicates with the vehicle, or the like. In certain embodiments, the computer-implemented method or system may be programmed into the multi-fuel control 50 of the controller 48 (e.g., electronic control unit) shown in FIG. 1.

For example, in certain embodiments as described above, a system may include a computer readable medium (e.g., control 50 of FIG. 1) and code (e.g., processes 100, 120, or 140 of FIGS. 2-4) disposed on the computer readable medium, wherein the code comprises instructions to adjust one or more parameters affecting operation of an engine to account for different fuel characteristics of a plurality of different fuels. The code may include instructions to control a specific fuel consumption, and instructions to control at least one of a peak firing pressure, a pre-turbine temperature, a turbospeed, or a maximum fuel injection pressure. The system also may include at least one of an engine control unit having the computer readable medium, an engine having the computer readable medium, or an engine powered vehicle having the computer readable medium.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
  operating an engine by combusting in the engine a plurality of different fuels available to the engine, alone or in combination with one another;
  based on sensed operational data of the engine during combustion, determining whether to control the engine to reduce specific fuel consumption of the plurality of different fuels as combusted;
  upon determining to control the engine to reduce the specific fuel consumption, controlling a first parameter set of the engine to reduce the specific fuel consumption of the plurality of different fuels as combusted; and
  controlling a second parameter set of the engine to avoid exceeding one or more acceptable limits associated with the engine during combustion of the plurality of different fuels.

2. The method of claim 1, wherein controlling the first parameter set comprises controlling at least one of fuel injection timing, fuel supply pressure, or fuel supply temperature.

3. The method of claim 1, wherein controlling the first parameter set comprises controlling manifold air pressure.

4. The method of claim 1, wherein controlling the first parameter set comprises controlling engine speed.

5. The method of claim 1, wherein controlling the first parameter set comprises reducing specific fuel consumption and reducing at least one exhaust emissions parameter comprising at least one of nitrogen oxides, particulate matter, hydrocarbons, or carbon monoxide.

6. The method of claim 1, wherein controlling the second parameter set comprises maintaining a peak firing pressure below an acceptable limit.

7. The method of claim 1, wherein controlling the second parameter set comprises maintaining a pre-turbine temperature below an acceptable limit.

8. The method of claim 1, wherein controlling the second parameter set comprises maintaining a turbospeed below an acceptable limit.

9. The method of claim 1, wherein controlling the second parameter set comprises maintaining a maximum fuel injection pressure below an acceptable limit.

10. The method of claim 1, wherein controlling the first parameter set and controlling the second parameter set comprises selectively varying fuel injection timing, fuel supply pressure, fuel supply temperature, manifold air pressure, and engine speed to reduce the specific fuel consumption and maintain a peak firing pressure, a pre-turbine temperature, a turbospeed, and a maximum fuel injection pressure within acceptable limits.

* * * * *